(12) United States Patent
Miseki et al.

(10) Patent No.: US 7,361,396 B2
(45) Date of Patent: Apr. 22, 2008

(54) VACUUM INSULATING MATERIAL, REFRIGERATOR USING VACUUM INSULATING MATERIAL, VACUUM INSULATING MATERIAL MANUFACTURING METHOD, AND VACUUM INSULATING MATERIAL MANUFACTURING EQUIPMENT

(75) Inventors: Takashi Miseki, Ohira (JP); Kuninari Araki, Itakura (JP); Wataru Echigoya, Iwafune (JP); Tsuyoshi Kubota, Ohira (JP); Yuuji Arai, Tochigi (JP)

(73) Assignee: Hitachi Appliances, Inc., Tokyo (JP)

( * ) Notice: Subject to any disclaimer, the term of this patent is extended or adjusted under 35 U.S.C. 154(b) by 154 days.

(21) Appl. No.: 11/339,639

(22) Filed: Jan. 26, 2006

(65) Prior Publication Data

US 2006/0261718 A1   Nov. 23, 2006

(30) Foreign Application Priority Data

May 20, 2005   (JP) ............................. 2005-147503

(51) Int. Cl.
*F16L 59/06* (2006.01)

(52) U.S. Cl. ........................................ 428/69; 312/401

(58) Field of Classification Search ................. 428/69; 312/401

See application file for complete search history.

(56) References Cited

FOREIGN PATENT DOCUMENTS

| EP | 1 275 893 | 1/2003 |
|---|---|---|
| EP | 1 510 747 | 3/2005 |
| EP | 1 647 759 | 4/2006 |
| JP | 04-337195 | 11/1992 |
| JP | 10299982 A * | 11/1998 |
| JP | 2002-048466 | 2/2002 |
| JP | 2004-003534 | 1/2004 |
| JP | 2004-218747 | 8/2004 |

* cited by examiner

*Primary Examiner*—Alexander Thomas
(74) *Attorney, Agent, or Firm*—Antonelli, Terry, Stout & Kraus, LLP.

(57) ABSTRACT

A vacuum insulating material which minimizes the possibility of absorption of moisture or gas components by its core material during storage in the manufacturing process, improves manufacturing efficiency, and maintains and enhances heat insulation performance. A vacuum insulating material comprises: a core material as an inorganic fiber aggregate; a getter material which absorbs core material gas components; and an envelope with a gas barrier property which encases the core material. The getter material is contained in a housing area made by slitting the core material obliquely with respect to its surface or thickness and the opening of the housing area is narrowed by overlapping.

8 Claims, 8 Drawing Sheets

VACUUM INSULATING MATERIAL, REFRIGERATOR USING VACUUM INSULATING MATERIAL, VACUUM INSULATING MATERIAL MANUFACTURING METHOD, AND VACUUM INSULATING MATERIAL MANUFACTURING EQUIPMENT

CLAIM OF PRIORITY

The present application claims priority from Japanese application serial JP 2005-147503 filed on May 20, 2005, the content of which is hereby incorporated by reference into this application.

FIELD OF THE INVENTION

The present invention relates to a vacuum insulating material, a refrigerator using a vacuum insulating material, a vacuum insulating material manufacturing method, and vacuum insulating material manufacturing equipment.

BACKGROUND OF THE INVENTION

In recent years, with growing concern about global warming, the need for reduction in power consumption of home electric appliances has been widely recognized. Among home electric appliances, refrigerators in particular are products which consume much electric energy and therefore reduction in power consumption of refrigerators is indispensable to counter global warming. Since power consumption of a refrigerator, when the load in the refrigerator is constant, largely depends on the efficiency of an internal cooling compressor and the heat insulation performance of a heat insulating material associated with heat leakage from the inside of the refrigerator, it is important in refrigerator technological development to improve the compressor efficiency and the heat insulating material performance. As examples of the prior art for improving heat insulation performance, conventional vacuum heat insulating materials will be discussed next.

A vacuum heat insulating material uses a getter material to maintain the vacuum on the inside.

For example, Patent Document 1 (Japanese Patent Laid-Open No. 2004-3534) describes a vacuum insulating material in which a recess is made to house a getter material in the junction face of at least one of core material boards made by heating and pressure-forming an inorganic fiber material, in order to prevent a protrusion generated by the injected getter material from breaking the vacuum heat insulating material.

Patent Document 2 (Japanese Patent Laid-Open No. 2002-48466) describes a technique that a foam insulating material and a vacuum insulating material lie in space composed of an outer case and an inner case where the vacuum insulating material is composed of a getter material absorbing moisture and an envelope made of gas-barrier film, and the getter material is held unmovable between molded sheets of core material inorganic fiber without using any fixing member or any fixing structure such as a housing recess so that the adsorbent is held fixed in place during a vacuum insulating material manufacturing process such as an evacuation process and cost reduction is thus achieved.

Patent Document 3 (Japanese Patent Laid-Open No. 2004-218747) describes a vacuum insulating material composed of a core material, a getter material and an envelope wrapping them wherein the getter material is placed in a recess provided in the core material and the envelope facing the getter material is a laminate film having an aluminum foil layer, with a pierce-proof protective sheet between the getter material and the envelope, thereby preventing generation of pinholes during vacuum sealing.

The vacuum insulating material described in Patent Document 4 (Japanese Patent Laid-Open No. H4 (1992)-337195) includes a housing member whose inside is vacuum, an inorganic fiber mat lying in the housing member, and an inner film bag which temporarily compresses the inorganic fiber mat to prevent the vacuum insulating material from wrinkling, warping or bending.

It is known that, in order to prevent moisture or a gas component from the core material used in the vacuum insulating material from lowering a high degree of vacuum, a step of drying the core material or a similar step is taken to remove moisture and gas components from the core material before an evacuation step. It is also well known that a getter material such as synthetic zeolite or activated carbon is placed in the vacuum insulating material in order to absorb traces of moisture or gas components which would be generated from the core material when the core material is stored in a high degree of vacuum for a long time. Therefore, the core material from which moisture and gas components have been removed by a drying process, etc. must be immediately placed in a vacuum condition in which there are no moisture and gas components so that it does not absorb moisture or gas components from outside again.

However, in case of the above conventional techniques described in Patent Documents 1 to 3, the getter material is housed between plural core material boards and covered by plural sheets and thus a process of embedding the getter material is needed to house and hold in place the getter material or cover it with a protective sheet. During the embedding process, there is a possibility that the core material boards may absorb moisture or gas components in the atmospheric air.

Next, this problem will be explained referring to FIG. 13. FIG. 13 is a sectional view showing the structure of a conventional vacuum insulating material. In the figure, a vacuum insulating material 1 is composed of core members 2a and 2b, an envelope 3 and a getter material 4. A recess 5a is formed almost in the center of the plane of junction between the core members 2a and 2b and the getter material 4 is contained in this recess 5a. Therefore, for the getter material 4 to be placed between the core members, the core member 2b must be lifted to place the getter material in the recess 5a or the getter material must first be placed in the recess 5a of the core member 2a alone before the core member 2b is laid to cover the getter material 4. This means that working time is required to embed the getter material in this way and during such embedding work, the core member 2a or 2b may absorb moisture or gas components in the atmospheric air.

Besides, when a core material is used inside heat insulating walls of a refrigerator, etc, it may be necessary to prepare core material members of different sizes depending on the size of the refrigerator, etc. or the size or thickness of the heat insulating wall. This implies that core members must be stored in the course of manufacturing until all core members of required sizes are prepared. However, since core members after a drying process must be immediately stored under a vacuum in a dry space or the like in which there is no or the least moisture, in order to prevent the core members from absorbing moisture or gas components from outside (in the atmospheric air) and consequently the working process is very tight in terms of time. However, the above patent documents do not suggest any concrete measure to solve this problem.

Patent Document 4 does not suggest any concrete measure to prevent adhesion of moisture or gas components from outside to the inorganic fiber mat in the housing member.

The present invention has been made in order to solve the above problems inherent to the prior art and one object of the invention is to reduce absorption of moisture or gas components by a core material during storage in the course of manufacture. Another object of the invention is to provide a vacuum insulating material which improves the manufacturing efficiency and maintains and improves the heat insulation performance.

SUMMARY OF THE INVENTION

In order to achieve the above objects, a vacuum insulating material according to one aspect of the present invention includes: a core material as an inorganic fiber aggregate; a getter material which absorbs core material gas components; and an envelope with a gas barrier property which encases the core material, wherein the getter material is contained in a housing area made by slitting the core material obliquely with respect to its surface or thickness and the opening of the housing area is narrowed by overlapping.

According to another aspect of the invention, a vacuum insulating material includes: a core material as an inorganic fiber aggregate; a getter material which absorbs core material gas components; an inner film bag which encases the core material together with the getter material; and an outer barrier bag which encases the core material encased in the inner film bag together with the inner film bag, wherein the getter material is contained in a housing area made by slitting the core material obliquely with respect to its surface or thickness and the opening of the housing area is narrowed by overlapping in the thickness direction of the core material.

In the vacuum insulating material according to any of the above aspects of the invention, the core material is an inorganic fiber aggregate which is resilient in the thickness direction.

In the vacuum insulating material according to any of the above aspects of the invention, the core material is compressed in the thickness direction and an upper piece and a lower piece of the core material which are opposite to each other with the opening of the housing area between them are vertically overlapped to close the opening.

In the vacuum insulating material according to any of the above aspects of the invention, the oblique slit angle of the housing area made by slitting the core material obliquely with respect to its surface or thickness is 30 to 70 degrees from the vertical.

In the vacuum insulating material according to any of the above aspects of the invention, the size L2 of an overlap which closes an inlet portion of the housing area made by slitting the core material obliquely with respect to its surface or thickness is larger than the grain diameter of the getter material.

In the vacuum insulating material according to any of the above aspects of the invention, the thickness between the deeper end of the housing area made by slitting the core material obliquely with respect to its surface or thickness, and a core material surface opposite to the above core material surface, is larger than the grain diameter of the getter material.

According to a further aspect of the invention, in a refrigerator which has a storage compartment in a casing surrounded by heat insulating walls, the heat insulating walls has a vacuum insulating material between an outer panel and an inner panel, and the vacuum insulating material includes: a core material as an inorganic fiber aggregate; a getter material which absorbs core material gas components; and an envelope with a gas barrier property which encases the core material. Here, the getter material is contained in a housing area made by slitting the core material obliquely with respect to its surface or thickness and the opening of the housing area is narrowed by compressing the core material vertically.

According to a further aspect of the invention, a method of manufacturing a vacuum insulating material with a getter material inside a core material includes: a core material raw cotton compression step for pressing a core material by a jig with an opening; a step for making an oblique slit in a core material area corresponding to the opening; a step for widening the slit to shape a housing area; and a step for injecting a getter material into the housing area.

In addition, equipment of manufacturing a vacuum insulating material which achieves the above objects of the invention comprises: a core material holder on which a core material rests; a knife which makes a slit in a core material placed on the core material holder; and a stock area which holds a getter material to be contained in the slit, wherein: the knife and the stock area are located above the core material holder and movable with respect to the core material holder, and a member which moves in the direction of widening a slit made by the knife is provided at the tip of the stock area.

BRIEF DESCRIPTION OF THE DRAWINGS

The invention will be more particularly described with reference to the accompanying drawings, in which.

DETAILED DESCRIPTION OF THE PREFERRED EMBODIMENTS

Next, preferred embodiments of the present invention will be described referring to the accompanying drawings.

Figure 1:
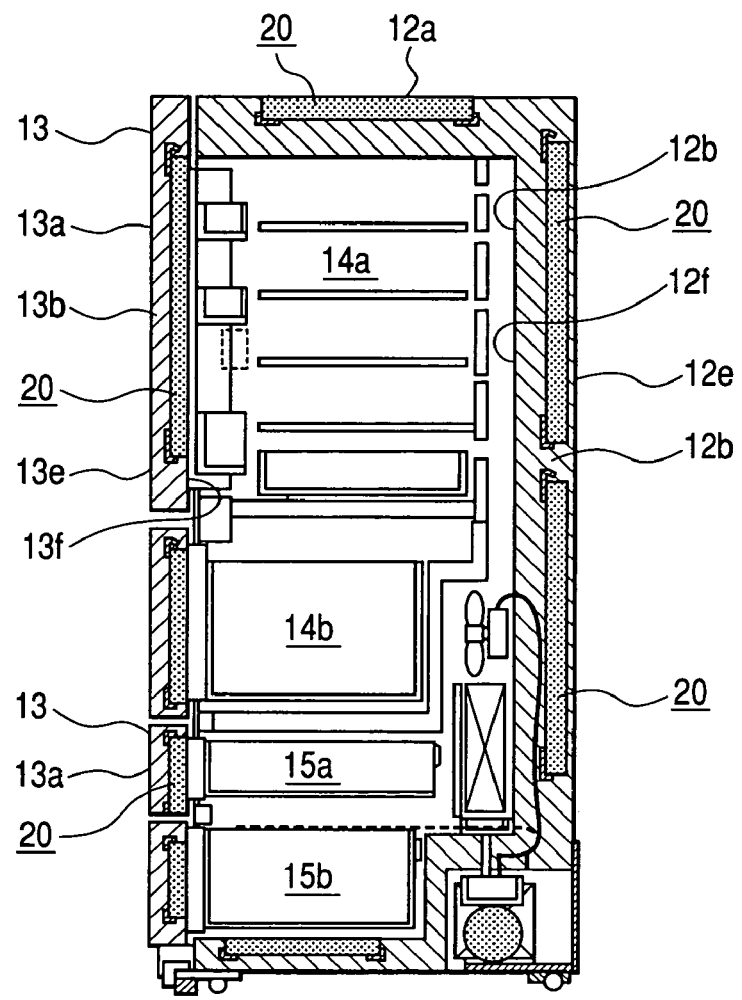
FIG. 1 is a longitudinal sectional view showing the key part of a refrigerator according to an embodiment of the present invention.
Figure 2:
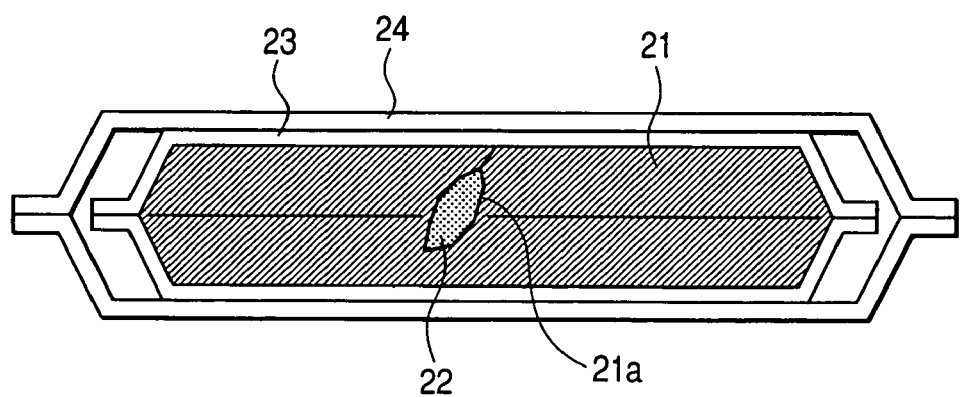
FIG. 2 is an explanatory sectional view of a vacuum insulating material according to an embodiment of the present invention.

FIG. 1 is a longitudinal sectional view showing the key part of a refrigerator according to an embodiment of the invention; and FIG. 2 is an explanatory sectional view of a vacuum insulating material according to an embodiment of the invention. As shown in FIG. 1, a casing 12 of a refrigerator has a plurality of doors 13 which open or airtightly close the openings of the casing 12. The inside of the casing 12 is divided into the following compartments: a cold storage compartment 14a, a vegetable compartment 14b, an ice making compartment 15a, a freezing compartment 15b and so on. A heat insulating wall 12a of the refrigerator casing 12 is composed of a heat insulating material in a space formed by an outer panel 12e of the casing 12 and an inner panel 12f of the casing 12.

A vacuum insulating material 20 lies in a space formed by the outer panel 12e and inner panel 12f and constitutes part of the heat insulating wall 12a. In this embodiment, the vacuum insulating material 20 is located either near the outer panel 12e or near the inner panel 12f in the heat insulating wall 12a. The vacuum insulating material 20 is fixed with adhesive foam insulating material 12b such as urethane filled in a space around the vacuum insulating material 20, constituting the heat insulating wall 12a.

A heat insulating wall 13a of the door 13 is composed of a heat insulating material in a space formed by an outer panel 13e of the door 13 and an inner panel 13f of the door 13; and the vacuum insulating material 20 lies in a space formed by the outer panel 13e and inner panel 13f. In this embodiment, like the casing 12, the vacuum insulating material 20 is located either near the outer panel 13e or near the inner panel 13f in the heat insulating wall 13a. The vacuum insulating material 20 is fixed with adhesive foam insulating material 13b such as urethane filled in a space around the vacuum insulating material 20, constituting the heat insulating wall 13a.

As mentioned above, the vacuum insulating material 20 is placed in the heat insulating walls 12a and 13a and the foam insulating materials 12b and 13b such as urethane which provide high heat insulation performance are used to improve the overall heat insulation performance of the heat insulating walls.

Next, the vacuum insulating material according to this embodiment will be described referring to FIG. 2. FIG. 2 is an explanatory sectional view of the vacuum insulating material according to this embodiment. An air-permeable core material 21 uses a material which has resilience under pressure; for example, an inorganic fiber such as a glass wool laminate with an average fiber diameter of 4 micrometers which does not include binder ("man-made mineral fiber thermal insulation material" in accordance with JIS A9504) is shaped to a specified size. Therefore, a vertically laminated core material is resilient when a pressure is applied vertically. In this embodiment, a material which is resilient in the height (thickness) direction is used as the core material. This core material 21 makes up a vacuum insulating material when its raw cotton as a resilient inorganic fiber aggregate is wrapped by an envelope material, as explained later. A getter material 22 is, for example, a molecular sieve 13× as synthetic zeolite which absorbs moisture and gas components from the core material 21, and is filled in a getter material housing area 21a made in the core material 21.

The core material 21 is covered by an inner film bag 23 and further encased in an outer barrier bag 24, thus constituting the vacuum insulating material 20. The inner film bag 23, which has a short-term gas barrier property, is made of heat-fusable synthetic resin film such as high-density polyethylene resin. Therefore, moisture or gas components from outside hardly penetrate the inner film bag 23. In other words, the core material 21 and getter material 22 easily absorb moisture and gas components contained in the atmospheric air; particularly the getter material 22 absorbs moisture and gas components from around the getter material 22 more quickly and powerfully. For this reason, the core material 21 and getter material 22 are covered by the inner film bag 23 with a gas barrier property in order not to absorb moisture or gas components from outside during a period of being embedded in the manufacturing process or while being stored in the manufacturing process.

The outer barrier bag 24, intended to cover the inner film bag 23, is an envelope made of laminate film with a long-term gas barrier property. The long-term gas barrier property of the outer barrier bag 24 should last for a long period equivalent to the average service life of refrigerators. In this embodiment, the outer barrier bag 24 has a laminate film structure composed of a deposition layer, a metal layer and a protective layer where the metal layer contributes to maintenance of the gas barrier property. However, the gas barrier property is not completely maintained and the degree of vacuum inside the outer barrier bag 24 gradually decreases over time.

Figure 3:
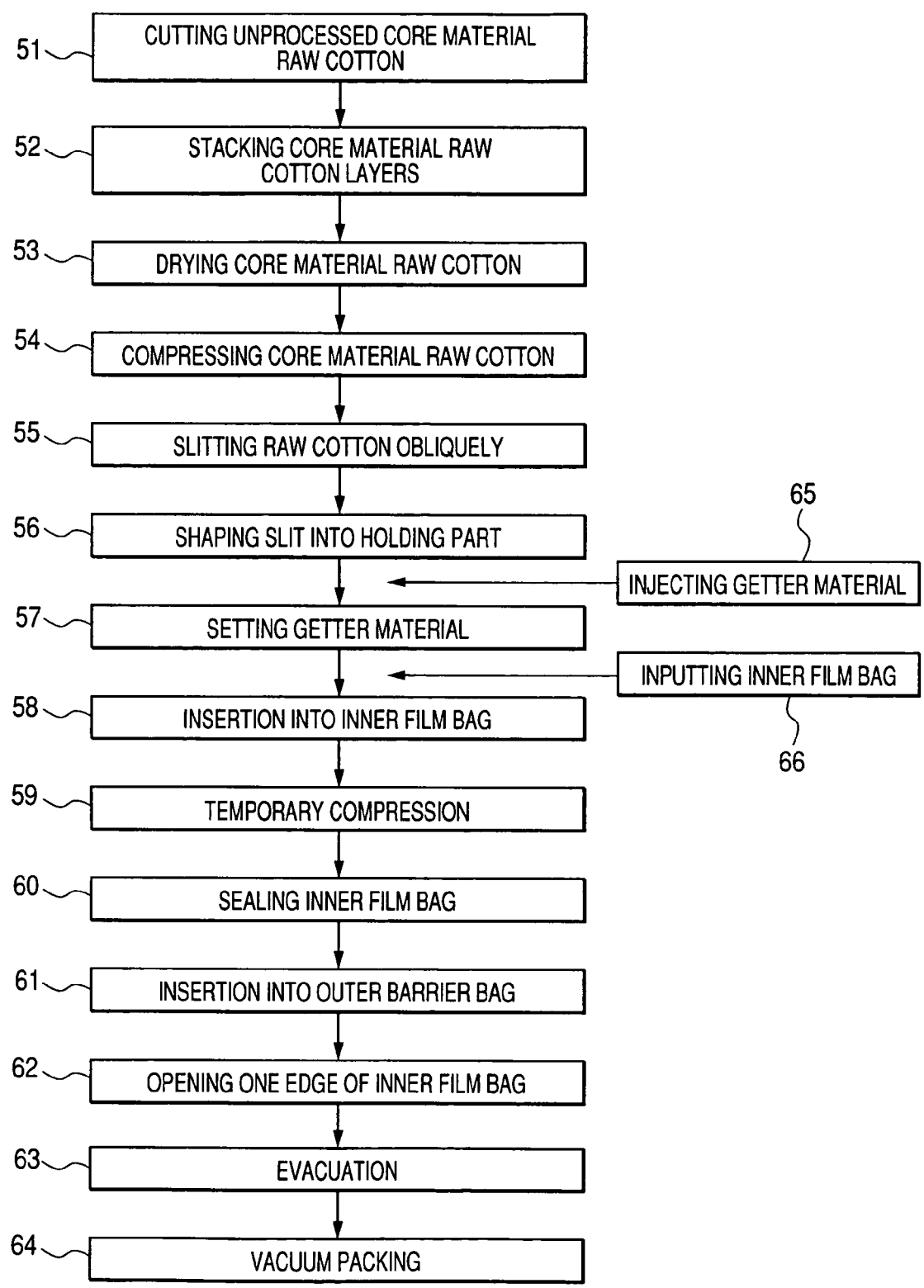
FIG. 3 is a flowchart explaining a vacuum insulating material manufacturing process.
Figure 4:
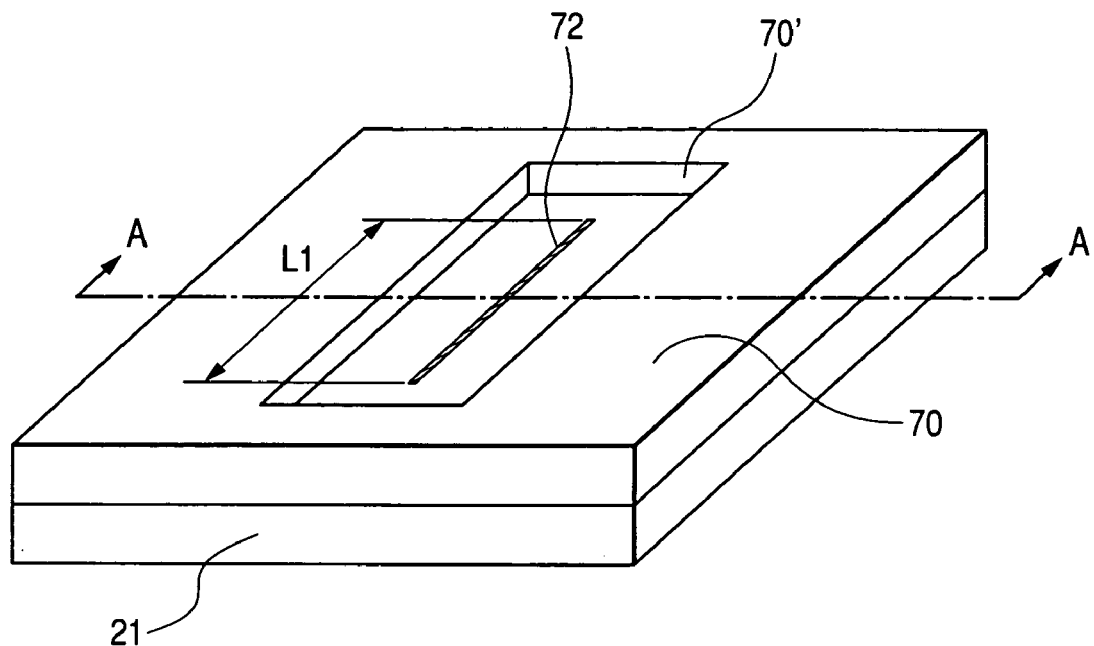
FIG. 4 shows the relation between a jig for compressing a core material, and a slit in the core material.
Figure 5:
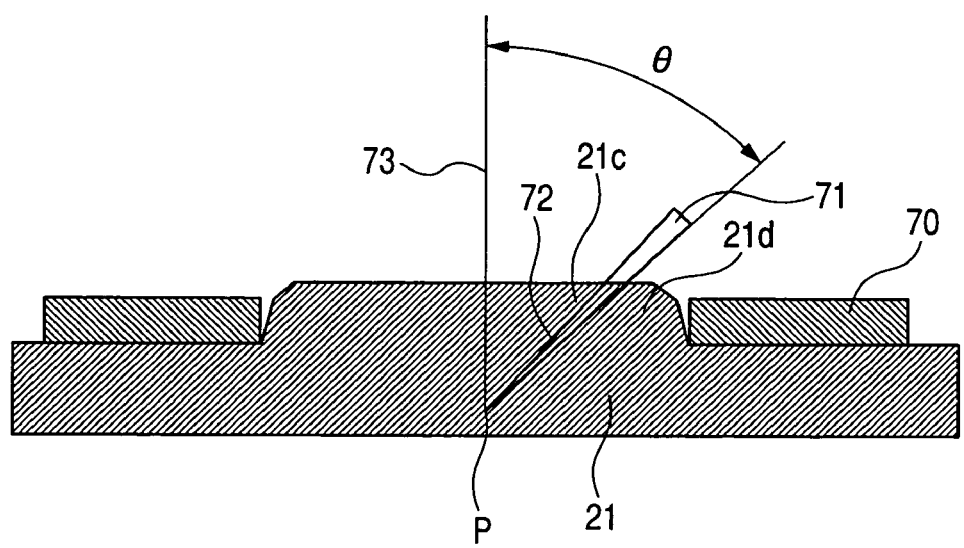
FIG. 5 is an enlarged sectional view taken along the line A-A of FIG. 4.
Figure 6:
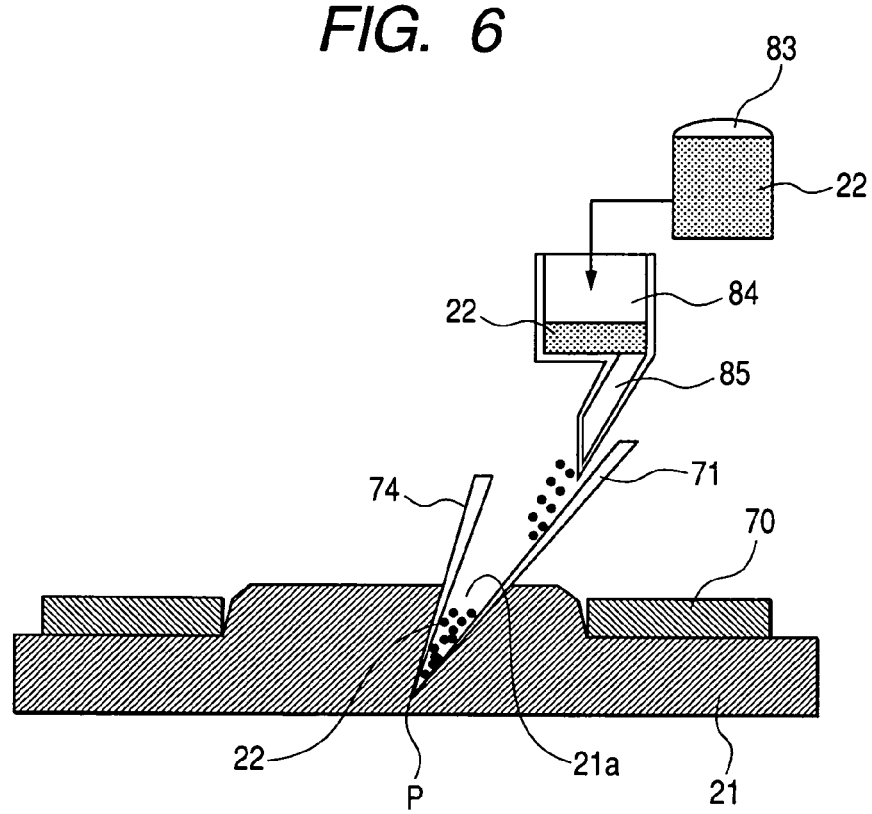
FIG. 6 shows how a getter material is filled in a slit in the core material as a getter material housing area.
Figure 7:
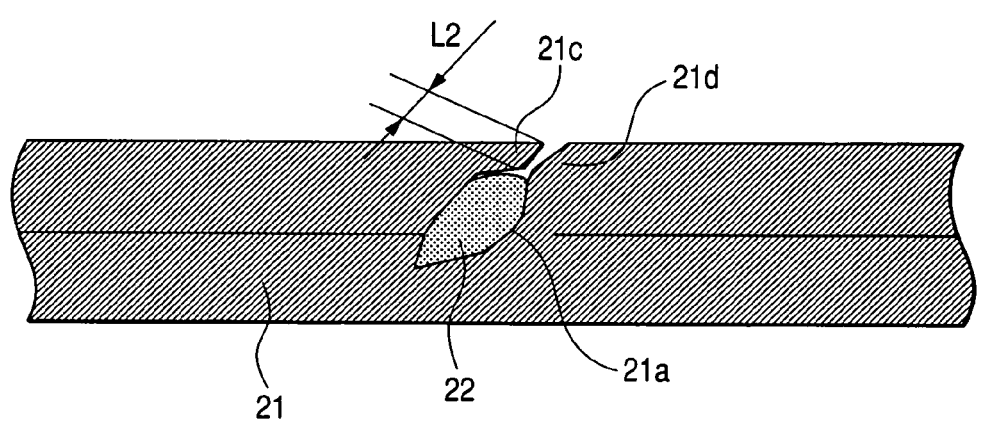
FIG. 7 shows a getter material housing area before insertion into an inner film bag.
Figure 8:
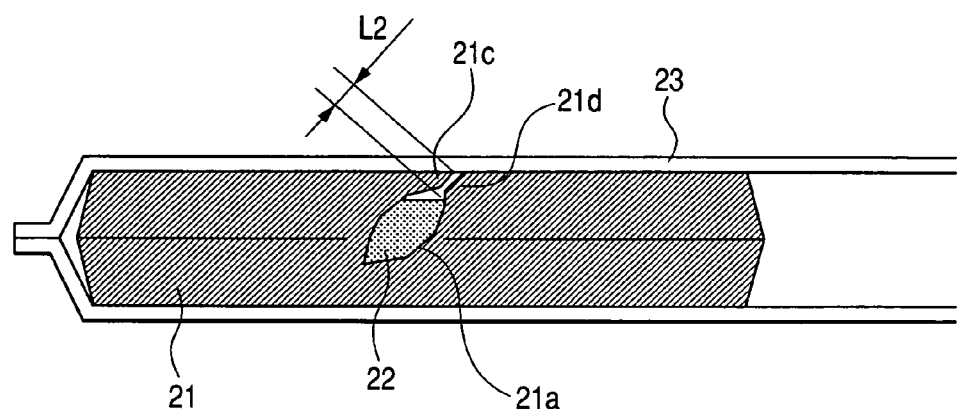
FIG. 8 shows the core material encased in the inner film bag.
Figure 9:
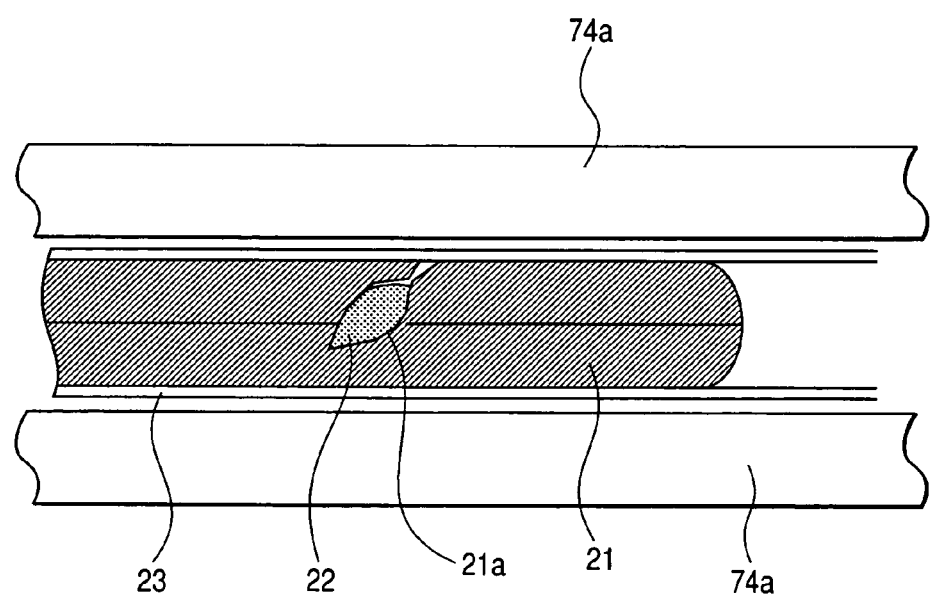
FIG. 9 shows that the inner film bag containing the getter material is temporarily compressed before its inside is deaired.
Figure 10:
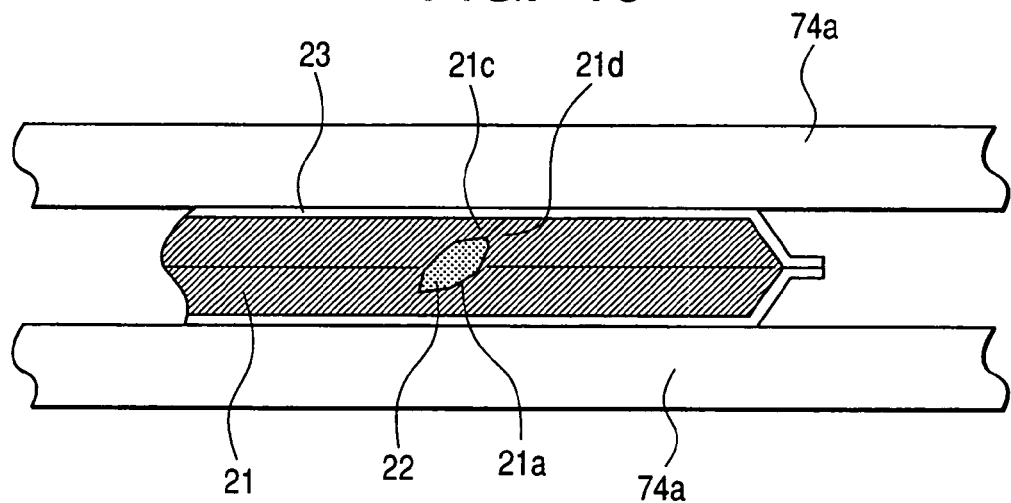
FIG. 10 shows that the core material is temporarily compressed with the inner film bag closed.

Next, the process of manufacturing the vacuum insulating material according to this embodiment will be explained referring to FIG. 3 to FIG. 10. FIG. 3 explains the process of manufacturing the vacuum insulating material; FIG. 4 shows the relation between a jig for compression of the core material and a slit in the core material; FIG. 5 is an explanatory sectional view taken along the line A-A of FIG. 4; FIG. 6 shows how the adsorbent is filled in the slit in the core material as the getter material housing area; FIG. 7 shows the getter material housing area with the compression jig of FIG. 6 removed before insertion in the inner film bag; FIG. 8 shows the core material put in the inner film bag; FIG. 9 shows that the inner film bag, which houses the getter material, is temporarily compressed before deairing of its inside; and FIG. 10 shows that the core material is temporarily compressed with the inner film bag closed.

Next, the process of manufacturing the vacuum insulating material according to this embodiment will be described referring to FIG. 3. At Step 51 for cutting unprocessed core material raw cotton, the core material as the above mentioned inorganic fiber such as a glass wool laminate is cut to a specified size. Step 52 for stacking layers of core material raw cotton is a step in which as many layers as specified are stacked where each layer is a piece of core material cut at Step 51 for cutting core material raw cotton. At Step 53 for drying core material raw cotton, the core material raw cotton layers which have been cut at Step 51 for cutting core material raw cotton and stacked at Step 52 for stacking layers of core material raw cotton are placed in a drying furnace at a temperature, for example, between 200-250° C. to remove moisture, etc which might lower the degree of vacuum. The core material raw cotton dried at Step 53 is compressed at Step 54 for compression.

Next, Step 54 for compression will be explained referring to FIGS. 4 and 5. As illustrated in FIG. 4, the upper face of the core material raw cotton 21 is compressed by a frame jig 70. The compression area should have such a size that allows the core material raw cotton to be inserted into the inner film bag at a later step.

In this embodiment, the jig 70 takes the form of a frame with an opening 70' and the area of the core material raw cotton 21 corresponding to the opening 70' is not pressed. As a result of compressing the core material raw cotton by the frame jig 70, the core material raw cotton 21's area not covered by the jig 70 (corresponding to the opening 70') remains not pressed and looks like an area raised up to the upper face of the frame, as illustrated in FIG. 5. In other words, since the core material is resilient in this embodiment, the area which has not been pressed remains uncompressed and consequently the area corresponding to the opening of the jig 70 becomes a raised area.

In the core material raw cotton 21 with a raised area made by Step 54 for compression, an oblique slit 72 is made in the raised area using a knife 71 as illustrated in FIG. 4. This oblique slit 72 is inclined by angle θ from the vertical 73 with respect to the thickness of the core material 21 as illustrated in FIG. 5, which prevents the getter material 22 from slipping out of the getter material housing area or prevents slippage of the knife 71 on the core material raw cotton 21. Therefore, the getter material can be filled in the housing area without deterioration in the working efficiency. Preferably the angle θ should be in the range of 30-70 degrees to ensure that an upper piece 21c and a lower piece 21d made by the oblique slit 72 vertically overlap each other when a compressive force is applied to the core material from both above and below or from either above or below using a press or the like. In this embodiment, the angle θ is 45 degrees and also the angle with respect to the surface of the core material 21 is 45 degrees so that the inorganic fiber of the upper piece 21c is not too thin and thus cannot curl up.

The deeper end P of the oblique slit 72 should be at least 5 mm away from the bottom surface of the core material raw cotton. Since the getter material 22 used in this embodiment has a grain diameter of 2-5 mm and the distance of the end P from the bottom surface is larger than the grain diameter, even when grains of the getter material 22 move during compression of the core material, it does not happen that contours of grains of the getter material 22 appear as protrusions on the surface of the core material 21, then eventually on the inner or outer barrier bag. In addition, since the end P is at least 5 mm away from the bottom surface, the strength of the vacuum insulating material is maintained.

Even when the getter material is a sheet or a rectangle, if the distance of the end P from the bottom surface is larger than the thickness of the sheet or the length, width and height of the rectangle, the same effect will be achieved.

As explained above, the slit 72 in this embodiment is not vertical but is inclined, for example, by 45 degrees and a getter material 22 is filled in the housing area made by the slit 72. In comparison with a vertical slit, this slit offers the following advantageous effects. Namely, in case of the vertical slit, its open end could not be covered when a compressive force is applied to the core material from both above and below or from either above or below; on the other hand, in this embodiment, due to presence of a vertically overlapped area, the open end is covered and the grainy getter material 22 cannot slip out of the groove. This minimizes damage to the inner or outer barrier bag by the grainy getter material 22, contributing to improvement in working efficiency.

After making this oblique slit 72, the slit 72 is shaped into a housing area at Step 56 for shaping the slit into a holding part. Step 56 for shaping the slit into a holding part will be explained referring to FIG. 6. The housing area 21a is a space large enough to house the getter material 22, which is made from the slit 72 made at Step 55 for slitting the raw cotton obliquely, with the aid of a support tool 74 as illustrated in FIG. 6. Specifically, the slit 74 is widened by the support tool 74 to make the linear slit a space larger than the getter material 22. At Step 65 for injecting getter material and at Step 57 for setting a getter material, the getter material 22 is put into the housing area 21a thus made.

Steps 56, 65 and 57 will be explained in more details referring to FIG. 6. After being sent from a getter material storage container 83 into a temporary stock container 84, the getter material 22 is injected into the housing area 21a formed by the knife 71 and the support tool 74 through a nozzle 85 using the knife 71 or support tool 74 as a guide member. The quantity of getter material 22 injected depends on the size of the vacuum insulating material. For a typical size of vacuum insulating material (400 mm in length, 500 mm in width, 10 mm in thickness), the quantity should be in the range of 5-10 grams. The getter material of 5-10 grams is almost uniformly filled into the housing area 21a made by shaping the slit 72 along its overall length L1 (150-250 mm) as shown in FIG. 4. Here, ideally, grains of the getter material 22 should not overlap each other.

As explained above, the getter material 22 is housed in the housing area 21a made in the area of the core material raw cotton which has not been compressed by the frame jig 70 and is inside the frame and raised up to the upper face of the frame, offering the following advantages. Since the area is uncompressed, it is easy to slit; and also when it serves as a housing area, the inner core material is pulled toward the frame, making it easy for the slit to open vertically. Hence, the support tool 74 is easily inserted as a guide for injection of the getter material 22 into the housing area. When the knife 71, support tool 74 and frame jig 70 are removed, the compressed core material is decompressed and tries to restore its original form in the closing direction, so that the upper piece 21c and the lower piece 21d narrow the inlet portion of the housing area 21a (L2) and thereby prevent the getter material 22 from spilling out. Furthermore, as a means to prevent spilling, an overlapping portion L2 of 5 mm or more (see FIG. 7), a portion where the upper piece 21c and the lower piece 21d overlap, is obtained above the housing area 21a, which further helps prevent the once housed getter material 22 from spilling out. In other words, length L2 is determined by increasing or decreasing length L1 (for example, 200 mm) according to the quantity of getter material 22 injected. The quantity of getter material which is housed depends on the size of the vacuum insulating material; the larger the vacuum insulating material is, the larger L1 can be, and the size of the portion for preventing spilling can be easily obtained regardless of the size of the vacuum insulating material.

Since the housing area 21a is an oblique slit in the thickness direction of the core material raw cotton as stated above, the slit can house the getter material 22 with a grain diameter of 3-5 mm or more. In addition, the housing area 21a can be expanded so that the getter material 22 is not confined into a small space and deterioration in the absorption performance is reduced.

According to this embodiment, the getter material 22 is uniformly distributed across the width of the core material raw cotton 21 (for example, 200 mm) and the quantity of getter material suitable for each size can be easily housed. In addition, the resilient core material makes it possible to carry out all the steps from Step 54 for compression to Step 57 for filling the getter material smoothly and also contributes to improvement in the heat insulation performance of the vacuum insulating material obtained through these steps.

Next, Step 66 for inputting an inner film bag and Step 58 for insertion into an inner film bag will be explained referring to FIG. 8. The core material raw cotton 21 containing the getter material 22 is encased in an inner film bag 23 which has been put inside at Step 66 for inputting the inner film bag. As mentioned above, the inner film bag 23 has a short-term gas barrier property in a period for which various steps in the manufacturing process are carried out. When the core material raw cotton 21 is inserted into the inner film bag 23, the inlet portion (L2) of the housing area 21a containing the getter material 22 is bound by the inner film bag 23 and the opening of the housing area 21a is covered by the inner film bag 23, which further lowers the possibility that the getter material 22 may spill out.

After the core material raw cotton 21 is inserted into the inner film bag 23, Step 59 for temporary compression is taken. At this step, as illustrated in FIGS. 9 and 10, the inside of the inner film bag 23 is deaired using a jig 74a and the opening of the inner film bag 23 is sealed at Step 60 for sealing an inner film bag. At this time, regarding the L2 part of the housing area 21a, the core material raw cotton is compressed from above and/or below and the upper piece 21c and lower piece 21d in the obliquely slit inlet portion overlap each other, as illustrated in FIGS. 9 and 10. As the upper piece 21c is pressed at Step 59 for temporary compression, the inlet portion of the housing area 21a is closed, producing a "sealed condition." Therefore, the possibility that the getter material 22 in the housing area 21a may spill out is virtually eliminated. The size of the core material raw cotton compressed at Step 59 for temporary compression is determined taking into consideration a later step of insertion into an outer barrier bag. Also, considering that the vacuum insulating material will be recycled, this compressed size is determined so as to eliminate the possibility that the fiber as the base of the core material may break. At the inner film bag sealing step 60, the inner film bag 23 is sealed by thermal fusion with a heat plate, etc. though not shown. The core material 21 and the inlet portion (L2) of the getter material housing area 21a are stored compressed until they are used at a next step. In this embodiment, the core material is binderless, or a material which does not use binder. This is very advantageous from the viewpoint of recycling of the vacuum insulating material.

As explained so far, according to this embodiment, the getter material 22 is filled in the getter material housing area 21a made in the air-permeable core material 21; the inside of the inner film bag 23 is deaired so that the getter material 22 does not spill out of the getter material housing area 21a; and the inner film bag 23 and the core material 21 are compressed and the inlet portion (L2) of the housing area made by slitting obliquely is closed by overlapping of the upper and lower pieces, thus not only preventing the getter material 22 from spilling out, but also shortening the time required to set the getter material in place. Consequently, in the vacuum insulating material, absorption of moisture or gas components from outside by the core material hardly occurs.

In addition, the inner film bag 23 can be stored with the core material encased therein, which makes core material storage in the manufacturing process easy and increases the degree of freedom in the working process, so the vacuum insulating material enhances overall manufacturing efficiency. Besides, since the amount of moisture or gas components from outside which the core material 21 may absorb is very small, evacuation time to attain a high degree of vacuum in the core material 21 at a later step can be shortened, so that the vacuum insulating material is advantageous in terms of manufacturing cost.

Furthermore, since an inorganic fiber aggregate such as air-permeable glass wool is used for the core material, air well circulates to the getter material 22; consequently the moisture and gas contained in the inner film bag 23 are well absorbed and a high degree of vacuum is maintained for a long time. Therefore, it is very advantageous in providing an energy-efficient vacuum insulating material which maintains high heat insulation performance for a long time or a refrigerator which uses such a vacuum insulating material or in manufacturing such a vacuum insulating material.

Next, the inner film bag 23 containing the core material raw cotton 21 and the getter material 22, which has been prepared by carrying out the above steps, is sent to a step of insertion into an outer barrier bag 61, a step of opening one side of the inner film bag 62, an depressurization step 63 and a vacuum sealing step 64 before being finished as a vacuum insulating material. In the case of applying the vacuum insulating material to a refrigerator, it provides higher heat insulation performance and more handling ease when used together with an in-situ foam insulating material, as illustrated in FIG. 1.

The vacuum insulating material according to this embodiment can be applied for a wide variety of purposes; it can be used not only for refrigerators as exemplified by this embodiment but also for vehicles including aircraft, ships, cars and electric railcars, freezers, houses and so on.

Figure 11:
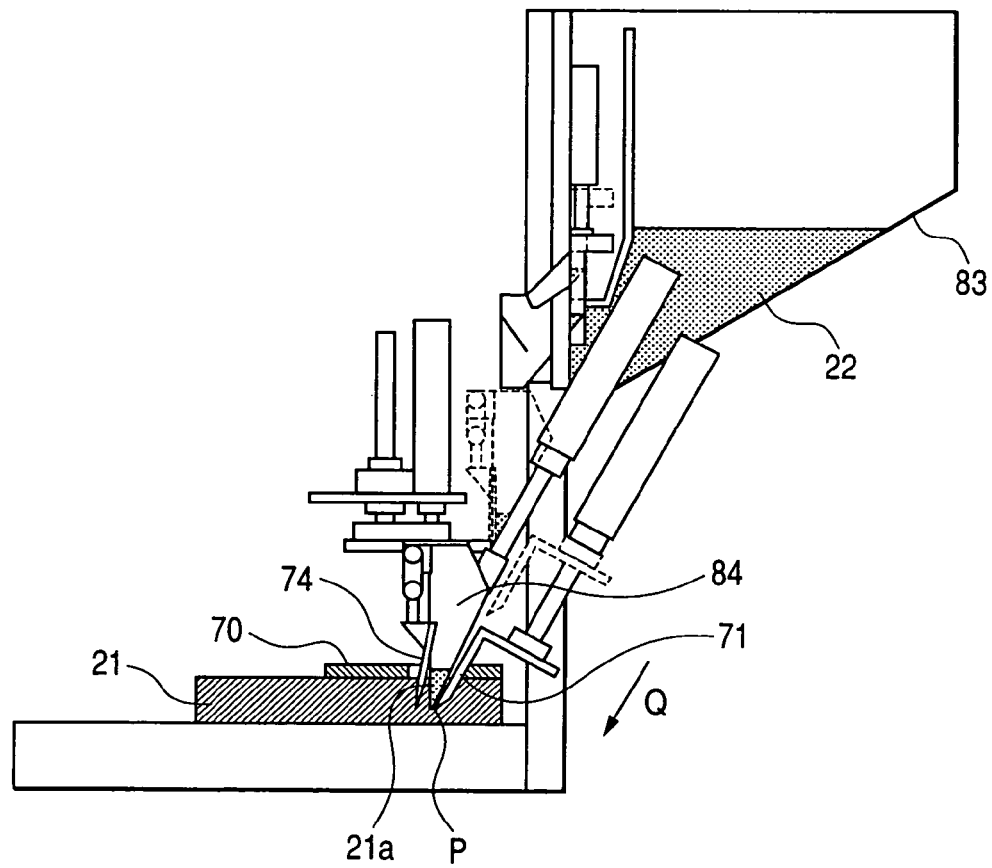
FIG. 11 shows how a slit is made in the core material raw cotton while the getter material is injected in the slit.

Next, referring to FIG. 11, an explanation will be given about equipment which handles the following three steps after the step of compressing the core material raw cotton 54 as shown in FIG. 3: Step 55 for slitting the raw cotton obliquely, Step 56 for shaping the slit into a housing area, and the step of injecting the getter material 65. FIG. 11 shows that, in equipment which carries out the above steps according to this embodiment, the getter material 22 is injected while the core material raw cotton 21 is being slit. In FIG. 11, numeral 21 represents core material raw cotton; 22 a getter material; 70 a frame jig; 71 a knife; 74 a support tool; 83 a storage container; 84 a stock area for the getter material 22. In this embodiment, the getter material 22 is stored in the storage container 83 and only the required quantity of getter material is supplied from the storage container 83 to the stock area 84, from which it is supplied to the housing area 21a in the core material 2. In this embodiment, the stock area is a container which temporarily holds the getter material 22 because the getter material 22 is grainy.

As illustrated in FIG. 11, the equipment includes: a core material holder on which the core material rests; the knife 71 which makes a slit in the core material 21 placed on the core material holder; and the stock area 84 which holds the getter material to be housed in the slit, where the knife 71 and the stock area 84 are located above the core material holder. The knife 71 and the stock area 84 are movable with respect to the core material holder; and a member 74 which moves in the direction of widening the slit made by the knife 71 is provided at the tip of the stock area 84.

After the core material raw cotton 21 is compressed by the jig 70 until its thickness reaches a predetermined value, a slit is obliquely made in the compressed core material raw cotton 21 using the knife 71 inclined at angle θ (for example, 45 degrees) in this equipment. The knife 71 is installed in a movable manner so that a slit can be made in a desired part of the core material raw cotton 21 set in place in the equipment; and a slit is made from above in the core material raw cotton 21 placed on the core material holder of the equipment. Concretely, the knife 71, located above the core material holder, is moved from its position indicated by broken line in the oblique direction of arrow Q until the tip of the knife 71 reaches position P.

Then, the temporary stock container 84, which has received the getter material 22 from the storage container 83, moves from its position indicated by broken line while guided by the knife 71 and reaches the slit made by the knife 71 on the surface of the core material raw cotton 21. The tip of the temporary stock container 84 is acutely angled. When the tip reaches an inner part of the slit, for example, the slit end position P, the support tool 74, which constitutes one edge of the container 84, moves in the direction of widening the slit to shape the slit into a housing area 21a and pushes and widens the slit in the core material raw cotton 21 so that the 5-10 grams of getter material contained in the temporary stock container 84 is injected into the housing area 21a.

As explained above, the equipment integrates Step 55 for slitting the raw cotton obliquely, Step 56 for shaping the slit into a housing area, and the step of injecting the getter material 65 so that the working efficiency in manufacturing the vacuum insulating material is further improved.

Figure 12A:
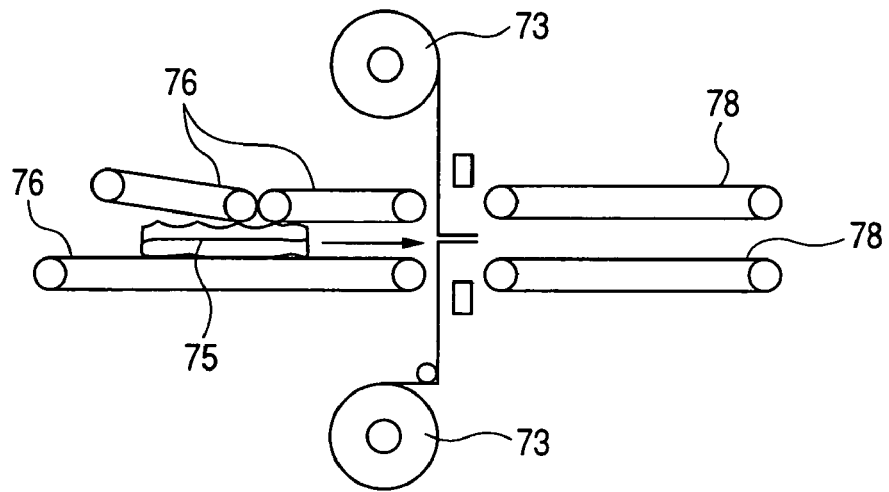
FIGS. 12A, 12B and 12C illustrate a process of making an inner film bag containing a core material.
Figure 12B:
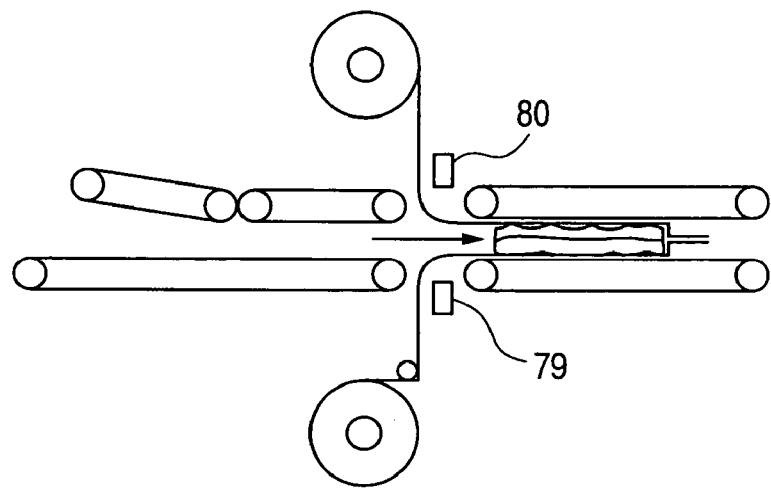
Figure 12C:
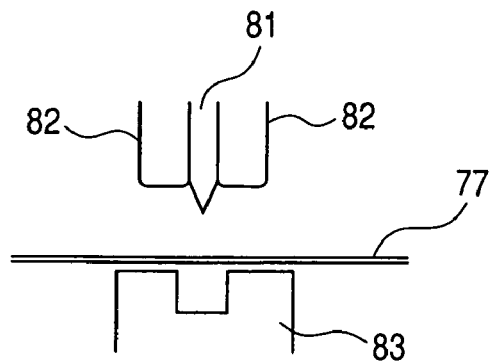
Figure 13:
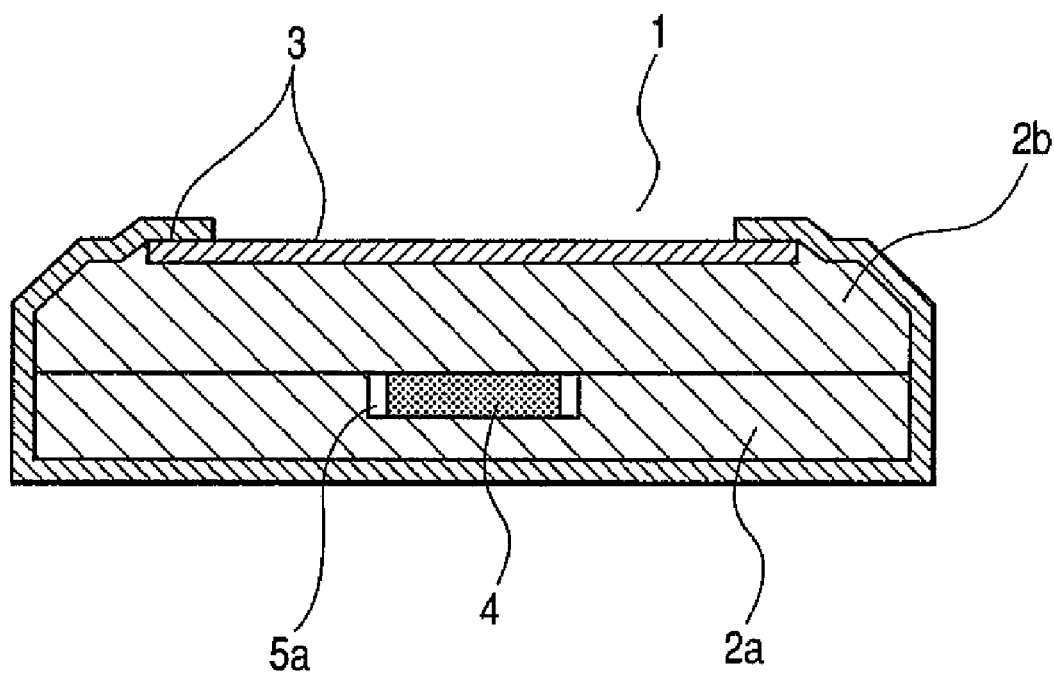
FIG. 13 is an explanatory sectional view of a conventional vacuum insulating material.

Next, referring to FIGS. 12A, 12B and 12C, an explanation will be given about the manufacturing steps related to the core material and the inner film bag, more specifically, Step 66 for inputting the inner film bag, the step of insertion into the inner film bag 58, Step 59 for temporary compression, and the inner film bag sealing step 60. FIGS. 12A, 12B and 12C explain a device which performs the above steps and details of the steps performed by the device. In other words, FIGS. 12A, 12B and 12C show an example of a manufacturing line which combines Step 66 for inputting the inner film bag, the step of insertion into the inner film bag 58, Step 59 for temporary compression, and the inner film bag sealing step 60.

As illustrated in FIG. 12A, the inorganic fiber aggregate 75 as the core material of the vacuum insulating material is conveyed as sandwiched between the upper and lower conveyors 76. Since the distance between the upper and lower conveyors is larger on the upstream side than on the downstream side, the inorganic fiber aggregate 75 is vertically compressed (temporarily) while it is conveyed from the upstream side to the downstream side by the conveyors 76. As the inorganic fiber aggregate 75 moves in the direction of arrow as shown in FIG. 12A and reaches a prescribed position, it is inserted into an inner film bag.

How the inorganic fiber aggregate 75 is inserted into an inner film bag will be explained referring to FIGS. 12A and 12B. In this embodiment, the inorganic fiber aggregate 75 is inserted into an inner film bag as it moves toward vertically stretched inner bag film 77 blocking the passage for conveying the inorganic fiber aggregate 75.

FIG. 12A shows that a roll of inner film bag 73 located above the upper conveyor on the upstream side is thermally fused to a roll of inner bag film 73 located below the lower conveyor on the upstream side where the thermally fused part lies in the passage for conveying the inorganic fiber aggregate 75. The condition as illustrated in FIG. 12A is a standby state for insertion.

The distance between the upper and lower conveyors of the upstream conveyors 76 is larger at the most upstream position than at a relatively downstream position; therefore as the inorganic fiber aggregate 75 is gradually compressed while being conveyed, before touching the inner bag film in the conveying passage. The distance between the downstream conveyors 76 is almost equal to, or shorter than, the distance between the upstream conveyors at a relatively downstream position.

The inorganic fiber aggregate 75 in the standby state for insertion is further conveyed in the direction of the arrow in FIG. 12A while being compressed by the upper and lower conveyors 76, before touching the inner bag film 77 which blocks the conveying passage. After touching the film, the inorganic fiber aggregate 75 is conveyed downstream by the conveyors 76, then conveyed together with the inner bag film 77 by the downstream conveyors 78, so that it is inserted in the inner bag film 77. In this embodiment, in the standby state for insertion, the thermally fused part of the film is in the passage for conveying the inorganic fiber aggregate 75, which implies no possibility that the thermally fused part may break due to contacting the upper or lower downstream conveyor 78.

As the inorganic fiber aggregate 75 and the inner bag film 77 are conveyed further downstream, the inner bag film 77 is cut by an inner bag film cutter and the cut part of the inner bag film 77 is thermally fused by a heat sealer. In this embodiment, cutter sealers 79 and 80 which combine the cutter function and the sealer function are located between the upstream conveyors 76 and the downstream conveyors 78, on the downstream from the inner bag film in its standby position (see FIG. 12A).

FIG. 12C shows the structure of the cutter sealer. A cutter part 81 and heat sealer parts 82 are located in a way to vertically sandwich two sheets of inner bag film in the conveying passage. The cutter part 81 is designed to melt film by heat. In the figure, the left and right heat sealer parts 82 are located in a way to hold the cutter part 81 between them in the conveying direction. The heat sealer parts 82 are, for example, heating bars which fuse the two sheets of inner bag film 77 together by heat.

The cutter part 81 protrudes downward from the heat sealer parts 82 on both sides of it in the conveying direction; as the cutter sealer 80 (see FIG. 12B) moves downward, it cuts the inner bag film 77 and fuses both sides of the cut part together. The cutter sealer 79, located opposite to the cutter sealer 80, is a receptacle 83 for the heat sealer parts 80 which has a recess to fit the protrusion of the cutter part 81. The size of the recess is larger than the size of the protrusion of the cutter part 81 from the heat sealer parts 82, which ensures that contact between the heat sealer parts 82 and the receptacle 83 is made reliably and thermal fusion is performed properly.

The film sheet parts downstream of the cut part are thermally fused together to make an inner film bag with the inorganic fiber aggregate 75 inserted; and also since the inorganic fiber aggregate 75 is compressed while being conveyed, air in the bag is forced out. The distance between the cutter sealer and the downstream conveyors 78 is shorter than the length of the inorganic fiber aggregate as the core material being conveyed in the conveying direction, and with the upstream side end of the core material held between the upper and lower downstream conveyors, one end of the inner film bag is cut and thermally fused. When the film sheet parts downstream of the cut part are thermally fused together, the standby state for insertion as shown in FIG. 12A is restored and the same steps as above are repeated for the next inorganic fiber aggregate 75 being conveyed. Thus, the steps of inserting an inorganic fiber aggregate into an inner film bag, forcing air out of the inner film bag and sealing the inner film bag can be continuously carried out, leading to an efficient manufacturing process.

This embodiment, which has a constitution as mentioned above and provides various steps as mentioned above, brings about the following advantageous effects. In a vacuum insulating material 20 which is composed of a core material 21 as an inorganic fiber aggregate, a getter material 22 which absorbs moisture, gas components and the like, an inner film bag 23 containing the core material 21, and an outer barrier bag 24 containing the inner film bag 23 or a refrigerator which uses the vacuum insulating material 20, the getter material 20 is filled in a housing area made by slitting the core material 21 obliquely with respect to its surface or its thickness; the core material is restored to its original state in the direction in which gravitation works; and a vertical overlap in the core material narrows the inlet portion of the housing area and thus closes the opening of the getter material housing area, eliminating the need for a special means to prevent the getter material from spilling out. Hence, the time required to set the getter material in place is shortened and the possibility that the vacuum insulating material may absorb moisture or gas components from outside is minimized. The use of this vacuum insulating material contributes to maintaining the heat insulation performance of a heat insulating wall of a refrigerator for a long time.

In addition, the core material 21 is compressed in its thickness direction and air is forced out of the inner film bag 23 containing the core material 21 and the upper and lower pieces of the core material in the inlet portion of the housing area containing the getter material 22 overlap each other vertically, thereby closing the opening of the housing area. Therefore, the overlapping part of the obliquely slit core material in the housing area inlet portion minimizes the possibility of small getter material grains spilling out of the housing area, so that the inner film bag 23 or the outer barrier bag 24 cannot break. Hence, a high degree of vacuum is maintained inside.

The angle of an oblique slit which is made by slitting the core material obliquely with respect to the surface or thickness of the core material 21 is between 30-70 degrees and in the inlet portion of the housing area as the oblique slit, the presence of a constant vertical overlap eliminates the need for a special means to prevent the getter material from spilling out.

The length L2 of the overlap which seals the inlet portion of the housing area made by slitting the core material 21 obliquely with respect to its thickness is larger than at least a getter material grain diameter of 2-5 mm. Therefore, the getter material contained in the housing area hardly spills out through the inlet portion; and also when the core material 21 is compressed in the thickness direction, grains of the getter material 22 in the vicinity of the inlet portion do not protrude from the surface of the core material 21 and the surface does not have protrusions, so that the inner film bag 23 and the outer barrier bag 24 cannot be damaged.

The remaining core material thickness from the deeper end P of the housing area (made by slitting the core material 21 obliquely with respect to its thickness) is larger than the grain diameter of the getter material 22 and therefore, even when the core material 21 is compressed in the thickness direction, grains of the getter material 22 in the vicinity of the slit end point do not protrude from the bottom surface of the core material 21 and the bottom surface of the core material 21 does not have protrusions, so that the inner film bag 23 and the outer barrier bag 24 cannot be damaged.

What is claimed is:

1. A vacuum insulating material comprising:
    a core material as an inorganic fiber aggregate;
    a getter material which absorbs core material gas components; and
    an envelope with a gas barrier property which encases the core material,
    wherein the getter material is contained in a housing area made by slitting the core material obliquely with respect to its surface or thickness and the opening of the housing area is narrowed by overlapping.

2. The vacuum insulating material as described in claim 1, wherein the core material is an inorganic fiber aggregate which is resilient in the thickness direction.

3. The vacuum insulating material as described in claim 1, wherein the core material is compressed in the thickness direction and an upper piece and a lower piece of the core material which are opposite to each other with the opening of the housing area between them are vertically overlapped to close the opening.

4. The vacuum insulating material as described in claim 1, wherein the oblique slit angle of the housing area made by slitting the core material obliquely with respect to its surface or thickness is 30 to 70 degrees from the vertical.

5. The vacuum insulating material as described in claim 1, wherein the size L2 of an overlap which closes an inlet portion of the housing area made by slitting the core material obliquely with respect to its surface or thickness is larger than the grain diameter of the getter material.

6. The vacuum insulating material as described in claim 1, wherein the thickness between the deeper end of the housing area made by slitting the core material obliquely with respect to its surface or thickness, and a core material surface opposite to the above core material surface, is larger than the grain diameter of the getter material.

7. A vacuum insulating material comprising:
    a core material as an inorganic fiber aggregate;
    a getter material which absorbs core material gas components;
    an inner film bag which encases the core material together with the getter material; and
    an outer barrier bag which encases the core material encased in the inner film bag together with the inner film bag,
    wherein the getter material is contained in a housing area made by slitting the core material obliquely with respect to its surface or thickness and the opening of the housing area is narrowed by overlapping in the thickness direction of the core material.

8. A refrigerator having a storage compartment in a casing surrounded by heat insulating walls,
    the heat insulating walls having a vacuum insulating material between an outer panel and an inner panel,
    the vacuum insulating material comprising
    a core material as an inorganic fiber aggregate;
    a getter material which absorbs core material gas components; and
    an envelope with a gas barrier property which encases the core material,
    wherein the getter material is contained in a housing area made by slitting the core material obliquely with respect to its surface or thickness and the opening of the housing area is narrowed by compressing the core material vertically.

* * * * *